United States Patent Office 2,857,157
Patented Oct. 21, 1958

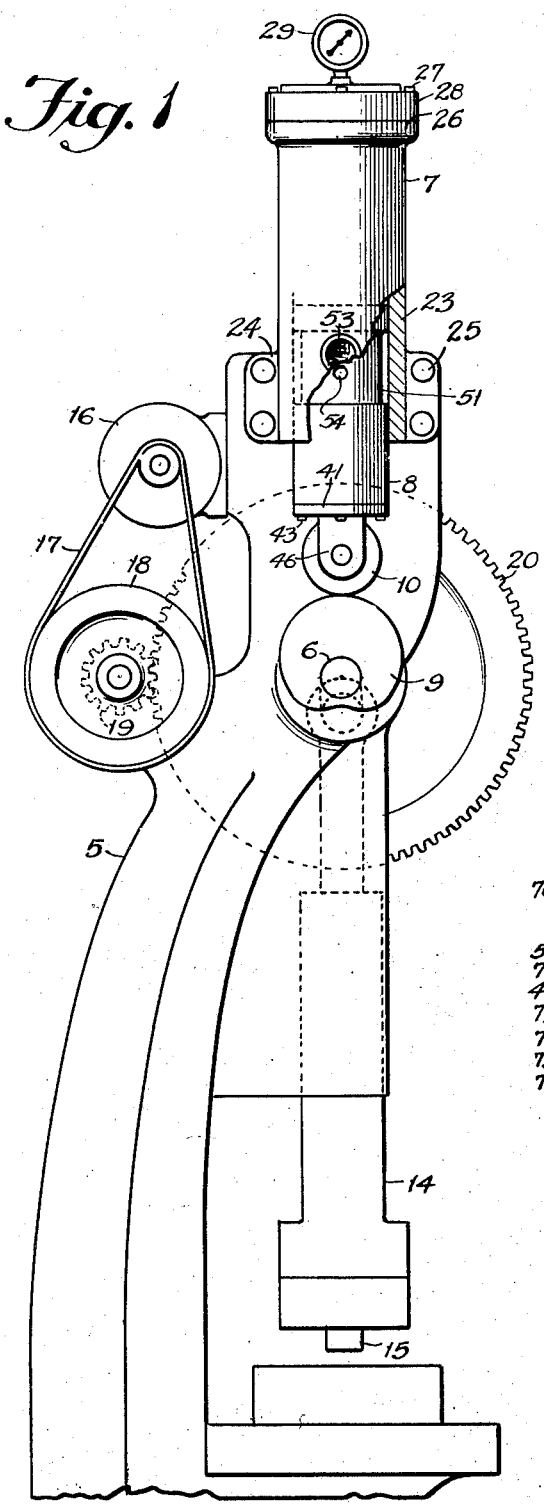

2,857,157

PUNCH PRESS COUNTER-BALANCING MECHANISM

John W. Bonquet, Pico, Calif., assignor to Diamond Machine Tool Company, Pico, Calif., a corporation of California Application December 7, 1953, Serial No. 396,678

4 Claims. (Cl. 267—1)

This invention relates to counterbalancing mechanism for punch presses and other metal working machine tool apparatus wherein a metal working tool is carried by a reciprocating tool carriage such as the ram of a punch press. The general object of the invention is to provide a counter-balancing mechanism, associated with the crank or eccentric shaft which imparts the reciprocating motion to the tool carriage, in a manner such as to substantially counterbalance the momentum developed in the carriage as the tool approaches the end of its working stroke, absorbing and storing the kinetic energy thereof and feeding such energy back into the crank shaft on the return stroke so as to assist the drive motor in returning the carriage to its retracted position, thereby reducing the load on the motor; at the same time cushioning the action of the mechanism in a manner to greatly reduce vibration and prolong the life of the machine as a whole.

It has hitherto been proposed to utilize mechanical spring mechanism for accomplishing this general purpose. A general object of the present invention is to provide an improved counterbalancing mechanism which eliminates the necessity for metal springs and correspondingly eliminates the likelihood of failure through crystallization and fatigue to which springs are subject, especially under the extremely destructive forces and heavy loads which are developed in a machine tool apparatus such as a punch press, during operation thereof.

Broadly, the invention contemplates the utilization of an air cushion principle in the counterbalance mechanism. I am aware that the use of air cushion mechanism for counterbalancig the momentum of reciprocating parts in various types of machinery is not broadly new, and has in fact been utilized in different species of machinery having reciprocating parts. A particular object of the present invention is to provide a compact air cushion counterbalance mechanism which is adapted to be readily applied to any machine tool apparatus having therein a crank shaft or eccentric which imparts reciprocating movements to a tool carriage. More specifically, the invention contemplates a compact air cushion counterbalance mechanism which may be simply incorporated in a machine tool apparatus by anchoring one end thereof to the fixed frame of the apparatus and associating the other end thereof with a cam which is attached to the crank shaft or eccentric of the machine.

Other objects will become apparent in the ensuing specifications and appended drawings in which:

Fig. 1 is a side elevation, partially in section, illustrating the improved counterbalance mechanism of my invention as applied to a punch press; and Fig. 2 is a vertical sectional view of the same, taken through the central axis thereof.

*General description of the invention and its applications to a punch press*

Referring now to the drawings, in detail, I have shown, as an example of one application of my improved counterbalance mechanism, a counterbalance unit for a punch press having a fixed frame, a portion of which is indicated at 5, and having a crank shaft, a fragment of which is illustrated at 6. In general, the counterbalance unit includes a fixed outer cylinder, indicated generally at 7; a movable inner cylinder, indicated generally at 8, a cam 9 mounted on the crank shaft 6, a roller 10, carried by the lower end of movable cylinder 8 and bearing against cam 9, and a fixed piston and pumping unit, indicated generally at 11. Defined between the closed upper end of moving cylinder 8, and the closed upper end of fixed cylinder unit 7 is an air cushion chamber A. Defined between the lower face of fixed pumping unit 11 and the closed lower end of moving cylinder unit 8 is a compression chamber B, in which is developed the pumping action which maintains a predetermined, fixed range of pressure in cushion chamber A, constantly replenishing any leakage from cushion chamber A that may occur in the operation of the apparatus. That is to say, the pumping mechanism will operate to maintain, at fixed values, the pressures in chamber A at its limits of expansion and contraction, i. e. its maximum and minimum volume limits. In Fig. 2, chamber A is shown at maximum volume and chamber B is shown at minimum volume, the moving cylinder unit 8 being shown at the upper limit of its reciprocating movement caused by the action of cam 9 against follower roller 10.

Briefly referring to the operation of the apparatus in a general way, the cam 9 is so arranged on crank shaft 6 so as to raise roller 10 and moving cylinder unit 8 to upper limit positions when crank shaft 6 of the punch press mechanism has moved the tool carriage (ram) 14 to the end (lower limit) of the working stroke of the tool 15 which is carried thereby. Thus, the momentum which is developed in carriage 14 during its downward stroke is cushioned and absorbed by the compression of air in the cushion chamber A as the moving cylinder unit 8 reaches the upper limit of its stroke. During the return stroke of carriage 14 as it moves upwardly, the energy stored in cushion chamber A is delivered back to the carriage 14 downward by pressure exerted through moving cylinder unit 8, roller 10 and cam 9, thus reducing the load upon motor 16 of the punch press mechanism. Motor 16 drives the crank shaft 6 through drive mechanism including a conventional belt 17, combined pulley and fly wheel 18, spur pinion 19, and combined spur gear and fly wheel 20, the latter being attached to crank shaft 6. The illustration of the punch press mechanism which has been briefly referred to above, is largely schematic, the general features thereof being well known and require no detailed illustration or description.

*Detailed description of invention*

Fixed outer cylinder unit 7 includes a cylindrical body portion 23 having bracket ears 24 whereby it is secured, as by means of bolts 25 to the fixed frame 5 of the punch press either above the crank shaft 6, as illustrated in Fig. 1, or, alternatively, below the crank shaft, according to the option of the designer of the particular machine tool apparatus to which the invention is to be applied. The lower end of cylinder body 23 is open and the upper end thereof has a thickened rim 26 to which is secured as by means of cap screws 27, a head 28 which closes the upper end of air cushion member A. A pressure gage 29 is mounted in head 28 and communicates with chamber A through a port 30, to constantly give a reading of the pressures in chamber A. The maximum pressure in chamber A (at the upper limit of movement of cylinder unit 8) is regulated by a pressure relief valve 31 which includes a ball valve element 32 normally seating against a valve seat 33 in the form of an annular shoulder, integrally fabricated in head 28 around a bleed port 34, ball valve 32 being yieldingly urged against its seat by a coil spring 35 which is adjustably loaded by a hollow adjustment screw 36 threaded into head 30 and secured in any selected position of adjustment by a set screw 37. Head 28 is sealed to rim 26 by an O-ring 38 received in the counterbore which is shown in the upper end of the rim 26.

Moving cylinder unit 8 includes a cylinder body 40 which is slidably fitted in the cylinder bore of fixed cylinder body 23 the lower end of cylinder 40 being closed by a bottom cap 41 having a marginal flange 42 which is secured to the lower end of cylinder body 40, as by cap screws 43, and is sealed thereto by an O-ring 44 received in the counterbore shown in the lower end of cylinder body 25.

Cap 41 forms an integral part of a roller bracket 46 of bifurcated form, consisting in a pair of spaced ears in which the axle pin 47 of roller 10 is mounted.

The upper end of moving cylinder body 40 is closed by a head 48 which is secured thereto as by cap screws 49 and sealed thereto by an O-ring 50 which is received in the counterbore shown in the upper end of cylinder body 40. The upper end portion of cylinder body 40 is sealed to the cylindrical bore of fixed cylinder body 23 by an O-ring 39. Below this upper portion of body 40, the latter has a reduced waist portion 51, formed by an annular recess in the outer wall of cylinder body 40, said recess, in conjunction with the cylinder bore of cylinder body 23, defining an annular inlet passage 52. Inlet passage 52 communicates with outside atmosphere through a port 53 in fixed cylinder body 23. Defined within moving cylinder unit 8, between upper head 48 thereof and the upper side of the pumping piston of pumping unit 11, is an inlet chamber C which communicates with annular inlet passage 52 through one or more inlet ports 54 in the reduced waist portion 51 in moving cylinder body 40.

The pumping unit 11 includes a fixed piston 60 which is secured to and carried by the lower end of a tubular piston rod 61. Piston 60 is sealed to the cylindrical bore of moving chamber body 40 by an O-ring 59 which is received in the annular groove shown in the periphery of piston 60. Piston rod 61 extends slidably through a central bore 62 in cylinder head 48, being sealed thereto by an O-ring 63 mounted in an annular groove 64 in head 48; and the upper end of piston rod 61 is anchored in fixed cylinder head 30. To this end, piston rod 61 may have a reduced upper end portion 65, threaded into a boss 66 in fixed cylinder head 30 and secured by a set screw 67 threaded into boss 66. An axial passage 68 in reduced shaft portion 65 communicates with air cushion chamber A through one or more radial ports 69 in the upper end of shaft 61, and communicates with bleed port 34 at its upper end. Thus excess air in chamber A is allowed to escape through check valve 31 in accordance with the setting of the latter, to maintain pressure in chamber A at a maximum range, the escape of air occurring at the upper limit of the upward stroke of moving cylinder unit 8, when compression in chamber A reaches a maximum.

Pumping mechanism is embodied in pumping piston 60, as follows: extending outwardly from the inner face of piston 60 is a port 70 which meets a counterbore to define a valve seat 72 in the form of an annular shoulder. Seat 72 forms part of a first stage check valve 73 which includes a valve ball 74 yieldingly seated against valve seat 72 by a compression coil spring 75 the outer end of which is engaged against a stop pin 76 mounted in piston 60 and traversing the counterbore. Piston 60 has an axial passage 77 and, at the lower end of passage 77, an integral annular valve seat 78, surrounding a port 79 which communicates with pumping chamber B. Valve seat 78 forms a part of a second stage check valve unit 80 which includes a valve ball 81, yieldingly seated against seat 78 by a coil spring 82. The upper end of coil spring 82 is seated against the reduced lower end portion 83 of valve shaft 61 by means of which the latter is secured to piston 60, being threaded into a counterbore therein, communicating with the upper end of passage 77. Piston shaft 61 has a central passage 84 which communicates with passage 77 to provide a path for air flow from pumping chamber B upwardly to cushion chamber A, the upper end of passage 84 communicating with the latter through radial ports 85 in valve shaft 61. A solid portion 86 of valve shaft 61 separates the upper end of passage 84 from the lower end of passage 68, so that all air pumped upwardly from the pumping mechanism will be deflected into chamber A and prevented from passing directly through check valve 31, and check valve 71 will operate strictly in response to excess pressures in chamber A above the predetermined maximum limit.

*Operation*

In the operation of my improved counterbalancing unit, the outer cylinder unit 7 will be rigidly fixed in position by the attachment 24, 25, to the punch press frame 5. Moving cylinder 8 will slide on a fixed axis, the roller 10 being constantly urged against cam 9 by the pressure in cushioning chamber A, and thus following the cam downwardly and constantly exerting pressure thereagainst as the punch press ram 14 is raised. The energy stored in the compressed air in chamber A will be delivered to the crank shaft 13 through cam 9 to assist in raising the ram 14, thus reducing the load of drive motor 16.

At this point it may be noted that the cam 9 may be a heart shaped cam, with a periphery divided into symmetrical halves of spiral form, designed to provide a dwell corresponding to the upper limit position of ram 14 and a high point corresponding to the lower limit position of ram 14. Thus the cam provides for a gradual increase in pressure in cushioning chamber A corresponding to the downward movement of ram 14 and constantly opposing the build-up of momentum therein, the kinetic energy of such momentum being transferred into the compressed air in cushion chamber A, and fed back into the crank shaft as the high point of the cam passes the roller 10 and the pressure of the roller against the cam commences to exert a forward driving action against the crank shaft 13. This feed back of energy into the crank shaft is accomplished by the expansion of the compressed air in chamber A, acting downwardly against moving cylinder head 48.

A portion of the energy of the compressed air in chamber A is utilized in a pumping action which is developed by the downward movement of lower end cap 41 of moving cylinder unit 8, moving away from fixed pumping piston 60 and creating in chamber B a partial vacuum which unseats check valve 73 and causes air to enter chamber B from inlet chamber C through port 70. In this connection it may be noted that atmospheric pressure is constantly maintained in inlet chamber C through ports 53, 52, and 54.

During such inflow into inlet chamber B, secondary check valve 80 will remain closed.

During upward movement of moving cylinder unit 8, check valve 73 will seat, and air will be compressed in chamber B until the pressure in chamber B slightly exceeds that in chamber A. At this point, check valve 80 will open and air from chamber B will be driven upwardly through passages 77 and 84 and ports 85 into air cushion chamber A.

As the pressure in chamber A rises, at a point near the upper limit of cylinder unit 8, the limit pressure at which check valve 31 is set to open, will be exceeded because of the additional air that has been pumped into chamber A. Thereupon, during the remainder of the upward stroke of cylinder unit 8, excess air will be vented past check valve 31 as previously described.

It will now be apparent that the invention provides, in a compact, coaxial unit, a combination of air cushion mechanism and pumping mechanism for constantly replacing any leakage of air in the air cushion chamber, whereby the momentum of the tool carriage in its working stroke will be partially absorbed by the compression of air in the cushioning chamber of the unit, with an attendant cushioning action which eases the jar of traverse from the downward stroke to the upward stroke of the tool carriage, and wherein the energy that is stored by the compression of air in the cushioning chamber will then be released back to the tool carriage to assist the prime mover of the machine tool in raising the carriage for the next stroke.

I claim:

1. In a pneumatic cushioning device: an outer cylinder having a closed end and an open end and having means for mounting the same in a fixed position; an inner cylinder slidable in said open end and having a cap on one end and a piston head on its other end, said cap having means for transmitting inward movement to said inner cylinder, said piston head cooperating with the closed end of said outer cylinder to define an air cushion chamber in which air is compressed by said inward movement of the inner cylinder; a tubular piston shaft anchored at one end to the closed end of said outer cylinder and projecting slidably through said piston head; a piston carried by the other end of said shaft, said piston being fitted within said inner cylinder and cooperating with said piston head to define an inlet chamber and with said cap to define a compression chamber; said cylinders having in their lateral walls communicating ports through which air at atmospheric pressure may enter said inlet chamber; said piston and shaft together having an axial passage extending from said compression chamber to said cushion chamber and communicating with the latter so that air may be pumped, by reciprocating movements of said inner cylinder, from said compression chamber, through said shaft and into said cushion chamber to maintain a selected maximum air pressure therein; a check valve in said axial passage to prevent escape of air from said cushion chamber back into said compression chamber; a lateral passage in said piston, at one side of said axial passage, extending from said inlet chamber to said compression chamber; a check valve in said lateral passage arranged to pass air flow from said inlet chamber to said compression chamber and to prevent reverse flow; and pressure relief means for bleeding from said cushion chamber to atmosphere air at pressure in excess of said maximum pressure.

2. A cushioning device as defined in claim 1, including means for adjusting said pressure relief means to a selected maximum pressure operating limit.

3. A cushioning device as defined in claim 1, wherein said inner cylinder has, intermediate said head and its outer end, an annular groove defining, with the inner wall of said outer cylinder, an annular space which is in communication with the atmosphere and said inlet chamber through said communicating ports.

4. A cushioning device as defined in claim 1, wherein said pressure relief means includes an end passage in the end of said shaft that is anchored in said closed end of the outer cylinder, said end passage communicating with said cushion chamber and extending through said closed end of the outer cylinder to atmosphere, and an outwardly-opening check valve in said end passage, spring loaded to open at the selected maximum pressure.

References Cited in the file of this patent

UNITED STATES PATENTS

| | | |
|---|---|---|
| 1,289,082 | Bangs | Dec. 31, 1918 |
| 1,565,658 | Liebau | Dec. 15, 1925 |
| 1,738,876 | Edwards et al. | Dec. 10, 1929 |
| 2,138,862 | Johnston | Dec. 6, 1938 |
| 2,141,951 | Criley | Dec. 27, 1938 |
| 2,359,960 | Anderson | Oct. 10, 1944 |
| 2,597,270 | White, Jr. | May 20, 1952 |